United States Patent
Feldmann

(10) Patent No.: US 9,427,833 B2
(45) Date of Patent: *Aug. 30, 2016

(54) ROLLING TOOL DEVICE

(71) Applicant: Rolls-Royce Deutschland Ltd & Co KG, Blankenfelde-Mahlow (DE)

(72) Inventor: Goetz Feldmann, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 444 days.

This patent is subject to a terminal disclaimer.

(21) Appl. No.: 14/026,772

(22) Filed: Sep. 13, 2013

(65) Prior Publication Data

US 2015/0367459 A1    Dec. 24, 2015

(30) Foreign Application Priority Data

Sep. 20, 2012    (DE) .................. 10 2012 018 605

(51) Int. Cl.
    *B23P 15/02*    (2006.01)
    *B21B 31/14*    (2006.01)
    *B23P 9/02*     (2006.01)
    *B24B 39/04*    (2006.01)
    (Continued)

(52) U.S. Cl.
    CPC ............. *B23P 15/02* (2013.01); *B21B 13/00* (2013.01); *B21B 31/14* (2013.01); *B21H 7/16* (2013.01); *B23P 9/02* (2013.01); *B24B 39/045* (2013.01); *C21D 7/08* (2013.01); *F01D 5/005* (2013.01); *Y02T 50/671* (2013.01); *Y02T 50/673* (2013.01)

(58) Field of Classification Search
    CPC .......... B21B 31/14; B21H 7/16; B23P 9/00; B23P 9/02; B23P 9/04; B23P 15/02; B24B 39/04; B24B 39/045; C21D 7/08

USPC ....................................... 29/90.01
See application file for complete search history.

(56) References Cited

U.S. PATENT DOCUMENTS

| 5,666,841 A | 9/1997 | Seeger et al. |
| 5,826,453 A | 10/1998 | Prevey, III |

(Continued)

FOREIGN PATENT DOCUMENTS

| DE | 496732 C | 4/1930 |
| DE | 4309176 A1 | 9/1994 |

(Continued)

OTHER PUBLICATIONS

German Search Report dated Jul. 1, 2013 from counterpart App No. 10 2012 018 605.3.

(Continued)

*Primary Examiner* — Debra Sullivan
(74) *Attorney, Agent, or Firm* — Timothy J. Klima; Shuttleworth & Ingersoll, PLC

(57) ABSTRACT

The present invention proposes a rolling tool device for compression rolling of, in particular, blade elements of a rotor area of a jet engine provided with a tool carrier to which two pliers-type bodies are rotatably connected about a joint pivot bearing relative to the tool carrier. The pliers-type bodies are each provided with a rolling area, and a distance between the rolling areas is variable in dependence of a rotary movement of the pliers-type bodies. The pliers-type bodies in the zone of the rolling areas are each provided with a part, where main axes of the parts have an extension component in the direction of a rotary axis of the pivot bearing.

14 Claims, 4 Drawing Sheets

Figure 1:
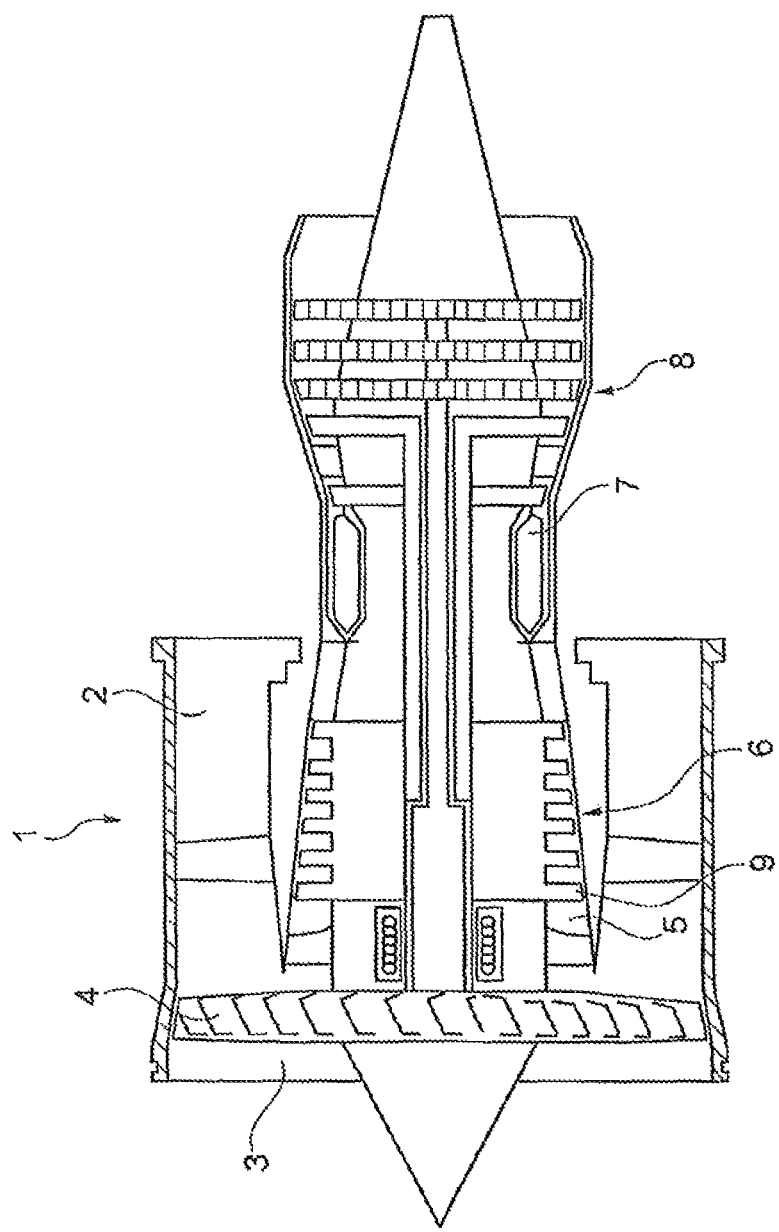

(51) Int. Cl.
  *C21D 7/08* (2006.01)
  *B21H 7/16* (2006.01)
  *F01D 5/00* (2006.01)
  *B21B 13/00* (2006.01)

(56) References Cited

U.S. PATENT DOCUMENTS

| | | |
|---|---|---|
| 6,568,077 B1 | 5/2003 | Hellemann et al. |
| 6,622,570 B1 | 9/2003 | Prevey, III |
| 7,089,773 B2 | 8/2006 | Paulsen et al. |
| 7,600,404 B2 | 10/2009 | Prevey, III |
| 8,408,036 B2 | 4/2013 | Reith |
| 2002/0037219 A1 | 3/2002 | Webster |
| 2002/0174528 A1 | 11/2002 | Prevey, III |
| 2006/0254333 A1 | 11/2006 | Lombardo |
| 2006/0277753 A1 | 12/2006 | Ntsama-Etoundi et al. |
| 2007/0234772 A1 | 10/2007 | Prevey |
| 2007/0281088 A1 | 12/2007 | Rutz |
| 2008/0003109 A1 | 1/2008 | Luna |
| 2008/0155802 A1* | 7/2008 | Luna et al. ............ 29/90.1 |
| 2008/0156104 A1 | 7/2008 | Luna |
| 2008/0160891 A1 | 7/2008 | Luna |
| 2010/0119375 A1 | 5/2010 | Rutz |
| 2010/0221118 A1 | 9/2010 | Prevey, III |
| 2011/0179844 A1 | 7/2011 | Hennig |
| 2012/0167573 A1 | 7/2012 | Belousov |
| 2012/0180278 A1 | 7/2012 | Bertoli et al. |
| 2013/0216391 A1 | 8/2013 | Feldmann |
| 2013/0219982 A1 | 8/2013 | Feldmann |
| 2015/0367458 A1* | 12/2015 | Feldmann .............. 72/252.5 |

FOREIGN PATENT DOCUMENTS

| | | |
|---|---|---|
| DE | 19511882 A1 | 10/1996 |
| DE | 19516834 A1 | 11/1996 |
| DE | 10 2011 007 223 | 10/2012 |
| DE | 10 2011 007 224 | 10/2012 |
| EP | 1607169 A1 | 12/2005 |
| WO | WO2004030858 A1 | 4/2004 |
| WO | 2007/055864 | 5/2007 |
| WO | WO2007055684 A2 | 5/2007 |

OTHER PUBLICATIONS

German Search Report dated Jul. 1, 2013 from related German application No. DE 10 2012 018 604.5.
German Search report dated Sep. 12, 2011 from related German application No. DE 10 2011 007 223.3.
English translation and International Search Report dated Jul. 19, 2012 from related International Application No. PCT/EP2012/056614.
German Search Report dated Mar. 28, 2012 from related German application No. DE 10 2011 007.224.1.
English translation and International Search Report dated Jul. 20, 2012 for related International Application No. PCT/EP2012/056612.
Feldmann—U.S. Appl. No. 13/823,698, filed Apr. 30, 2013.
Feldmann—U.S. Appl. No. 14/026,744, filed Sep. 13, 2013.

* cited by examiner

ROLLING TOOL DEVICE

This application claims priority to German Patent Application DE102012018605.3 filed Sep. 20, 2012, the entirety of which is incorporated by reference herein.

This invention relates to a rolling tool device according to the type more precisely described herein.

Rolling tool devices for compression rolling of, in particular, blade elements of a rotor area of jet engines are known from practice. These are usually provided with a tool carrier to which two pliers-type bodies are rotatably connected. The pliers-type bodies are each provided with a rolling area, with a distance between the rolling areas being variable in dependence of a rotary movement of the pliers-type bodies relative to the tool carrier. Such rolling tool devices, or pliers-type tools, respectively, enable blade elements, or thin-walled components, to be processed simultaneously from both sides of the thin-walled component by smooth rolling or compression rolling, respectively.

Blade elements are resolidified by compression rolling in order to enhance their resistance to foreign object damage and also vibratory loading by applying the rolling tool devices axially from the blade leading edge over the surfaces extending in the flow direction.

The rolling tool devices known from practice are however disadvantageous in that a part of the pliers-type bodies holding the rolling areas during an axial insertion movement of the rolling tool devices into the component to be machined, or during machining of components of complex design, restricts machining by these rolling tool devices, so that areas of the component are either insufficiently machined or not at all.

The object underling the present invention is to provide a rolling tool device, by means of which even components of complex geometries, such as blade elements of a rotor area of jet engines, can be machined in surface areas that are difficult to access.

It is a particular object of the present invention to provide solution to the above problematics by a rolling tool device designed in accordance with the features of patent Claim 1.

A rolling tool device for compression rolling of, in particular, blade elements of a rotor area of a jet engine provided with a tool carrier is suggested here, with two pliers-type bodies being rotatably designed relative to the tool carrier about a joint pivot bearing, with the pliers-type bodies each being provided with a rolling area and with a distance between the rolling areas being variable in dependence of a rotary movement of the pliers-type bodies. In accordance with the invention, it is proposed that the pliers-type bodies in the zone of the rolling areas are each designed with one part, where main axes of the parts have an extension component in the direction of a rotary axis of the pivot bearing.

With the rolling tool device in accordance with the invention, even complex-shaped components, in particular blade elements of rotor areas of jet engines or areas of these components, not machinable with conventional rolling tool devices can be compression rolled. This results from the fact that an insertion of the rolling tool device into blade elements of the rotor area is easily possible due to the parts of the pliers-type body having an extension component in the direction of the rotary axis of the pivot bearing. An inclination of the parts in the direction of the rotary axis in particular matches an insertion direction of the rolling tool device into the blade elements and is selected such that insertion of the rolling tool device is readily possible. The use of the rolling tool device in accordance with the invention is particularly advantageous for machining multi-stage rotor areas in blisk design, where areas of blade elements, in particular blade leading edges and blade trailing edges of a second, third or following stage of a rotor area, are also to be machined. The part of the pliers-type body can have a required length and be designed either straight or curved, with the respective shape and size of the further part being selectable depending on the respective component to be machined.

The parts are designed in the zone of the rolling areas in particular with a bar, cylinder or tube shape or the like, with a main axis corresponding to a center axis of the parts, when the parts are designed symmetrically.

In the case of an advantageous embodiment of a rolling tool device in accordance with the invention, the parts extend substantially in the direction of the rotary axis of the pivot bearing. As a result, an insertion of the rolling tool device in the axial direction of the rotor area is advantageously possible for the machining of leading edges and trailing edges of the blade elements, without a part of the pliers-type bodies that extends in the longitudinal direction or in the extension direction of the pliers-type bodies in the zone of the rolling areas being able to hinder insertion of the rolling tool device into the blade elements. The part of the pliers-type bodies can also be designed curved.

In a simply designed embodiment of a rolling tool device in accordance with the invention, the pliers-type bodies have a further part which, in the direction of the rotary axis of the pivot bearing, is arranged at a distance to axes passing through a machining point of the rolling areas and parallel to an axis of a carrier spindle in the state connected to the tool carrier. Due to the arrangement of the further part of the pliers-type bodies offset relative to the axis of the carrier spindle, an axial insertion movement of the rolling tool device into a component to be machined is not hindered. The further part of the pliers-type bodies can have a distance to the axis of the carrier spindle as required depending on the component to be machined.

In a rolling tool device, that can easily be manufactured, the further part of the pliers-type bodies can in particular run substantially parallel to the axis of the carrier spindle.

If the pliers-type bodies are designed with adapter elements incorporating the rolling areas, preferably differing axial and radial engagement depths can be realized by differently designed adapter elements using the rolling tool device and also rolling forces of differing levels for the respective component to be machined, with a low design effort and at low cost.

The adapter elements are preferably interchangeably connectable to the pliers-type bodies, so that adapter elements optimized for the respective application can be connected in turn to the pliers-type bodies.

In a simple embodiment of the rolling tool device in accordance with the invention, the part or parts of the pliers-type bodies is/are an integral part of the adapter elements.

The adapter elements have, in an embodiment of the rolling tool device in accordance with the invention that can be manufactured in a simple and inexpensive way, a substantially U-shaped cross-section. Due to a U-shaped or angled design of the pliers-type bodies or adapter elements, engagement for axial machining of a blade leading edge and a blade trailing edge, in particular of multi-stage rotor areas in blisk design, is made possible in a particularly simple manner.

In order to facilitate programming and subsequent implementation of the manufacturing programs on multi-axes machining centers as compared to rolling tool devices known from practical applications, in a particularly advantageous embodiment of the rolling tool device according to the present invention the axis of the carrier spindle in the state connected to the tool carrier passes between the rolling areas through a contact point present at a distance between the rolling areas equal to zero, by which the axis of the carrier spindle and a contact line between the rolling tool device and a component to be processed are essentially congruent. Thus, in particular during the processing of free-form surfaces of a workpiece, alternating positional changes and permanently changing vectors resulting therefrom need not be taken into account when programming the production process.

In an advantageous embodiment of the rolling tool device according to the present invention a distance between the rolling areas remains constant during rotary movement of the pliers-type bodies about the joint pivot bearing. This ensures that—upon contact of the rolling areas with a preferably thin-walled component, such as a blade element of a rotor area of a jet engine—distortion of the component to be processed due to contact of the rolling areas is avoided. Additionally, the joint rotatability of the pliers-type bodies, and thus the rolling areas, enables areas of a free-form surface to be approached which would not be reachable without the joint rotatability of the pliers-type bodies.

If the pliers-type bodies are operatively connected to the tool carrier via piston elements by means of which the pliers-type bodies are rotatable relative to the tool carrier about the pivot bearing to a zero position defined relative to the tool carrier, the rolling tool device can be operated with low control effort since the zero position of the pliers-type bodies in each case is automatedly set relative to the tool carrier.

In an embodiment of the rolling tool device according to the present invention which likewise can be operated with low control effort, the pliers-type bodies are coupled to each other via a driving unit and the distance between the rolling areas is reducible in dependence of a driving unit-side rotary movement of the pliers-type bodies relative to each other.

In a simply designed and cost-effective embodiment of the rolling tool device according to the present invention, the driving unit is provided as a single-acting piston-cylinder unit.

To widen an application range of the rolling tool device in accordance with the invention, the driving unit, in particular a piston element of the driving unit, can be interchangeable. As a result, a force from the driving unit acting on the respective component can be optimally matched for the respective application to the respective component to be machined, or a defective piston element can be replaced by a new piston element.

If a resetting device is associated with the pliers-type bodies, through which a distance between the rolling areas can be changed by rotating the pliers-type bodies on the side of the resetting device relative to each other in the direction of a maximum value, engagement between the rolling areas of the rolling tool device and the respective component to be processed can be dispensed with as desired.

If the rolling areas include a ball element each, point contact exists between the rolling areas and the respective component to be processed, by which high surface pressure is attainable with comparatively low forces and, thus, high residual stress, with at the same time high surface finish, is impartable to surface-near areas of the component to be processed. An interchangeable arrangement of the ball elements at the rolling areas permits a simple change of the ball elements, if they are for example worn.

In an advantageous embodiment of a rolling tool device in accordance with the invention, an in particular separate spacer device can be provided by means of which a minimum distance of the rolling areas of the pliers-type bodies to one another can be fixed, in particular variably. The advantage of this is that by defining a minimum distance between the rolling areas using the spacer device, deformation of a blade leading edge during machining of rotor areas is reliably avoided, while the introduction of forces to an undesired extent into the area of the blade leading edge is prevented. This results from the fact that by appropriate selection of the minimum distance, a front-most area of the blade leading edges facing towards an insertion movement of the rolling tool device is machined only slightly or not at all and hence is not deformed and in the worst case damaged. Furthermore, a particularly consistent inducement of residual stresses and also a reduction in a resultant stress-induced distortion are achievable with the rolling tool device in accordance with the invention. A further advantageous effect is that the provision of the spacer device makes it easy to prevent the rolling areas of the pliers-type bodies from coming into contact with one another prior to their engagement in the component, and to prevent a force acting between the rolling areas as a result of tolerances from exceeding a limit value, so that the rolling areas are not damaged. The spacer device represents in particular a separate component of the rolling tool device which can accordingly be arranged and dimensioned regardless of further functions.

The minimum distance of the rolling areas can be set mechanically, hydraulically, pneumatically, electrically, magnetically, thermically and/or chemically.

Both the features cited in the patent Claims and the features specified in the following exemplary embodiment of the rolling tool device in accordance with the present invention are, alone or in any combination, capable of further developing the subject matter of the present invention. The respective combinations of features are in no way limiting the development of the subject matter of the present invention, but essentially have only exemplary character.

Figure 3:
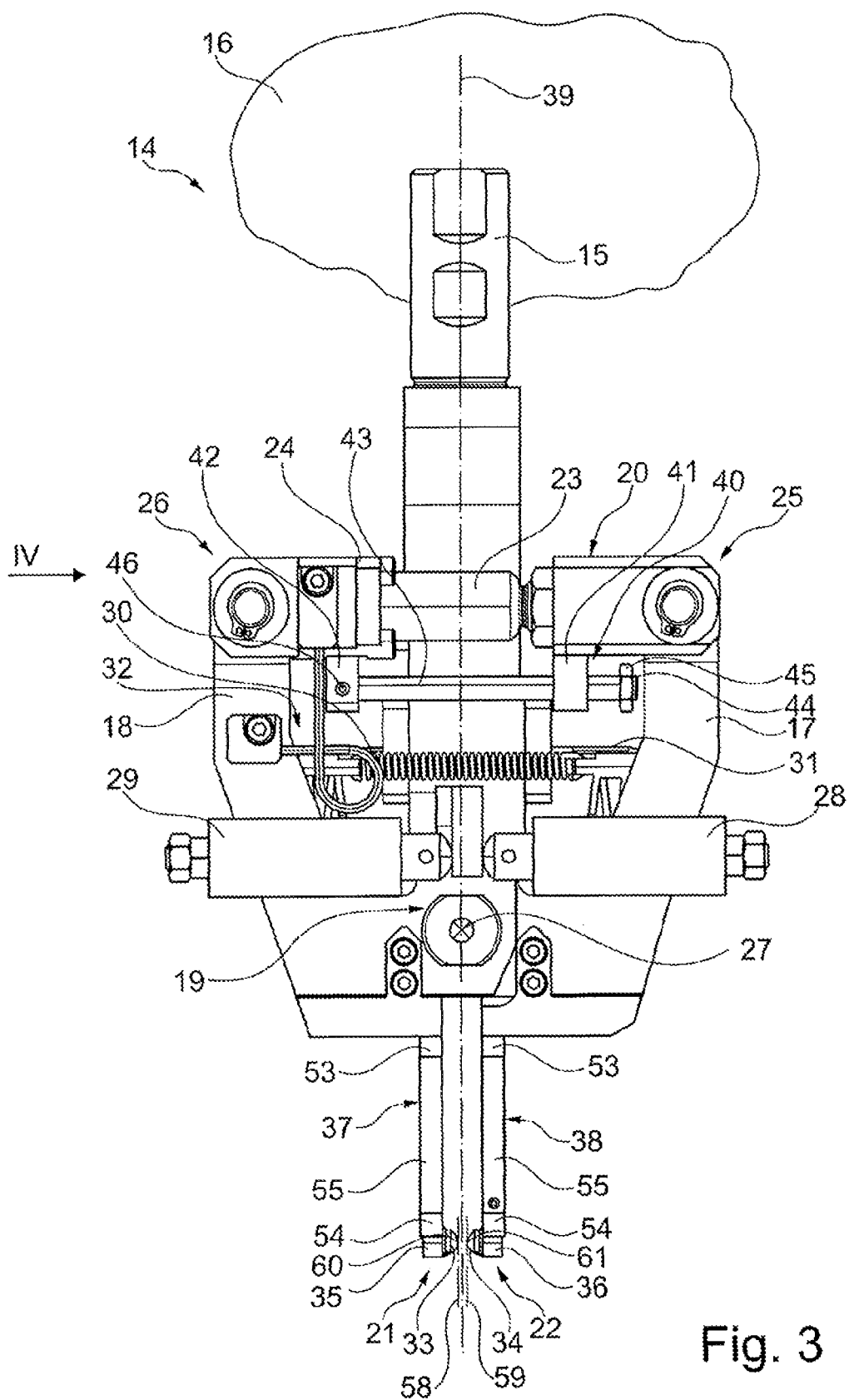
Figure 4:
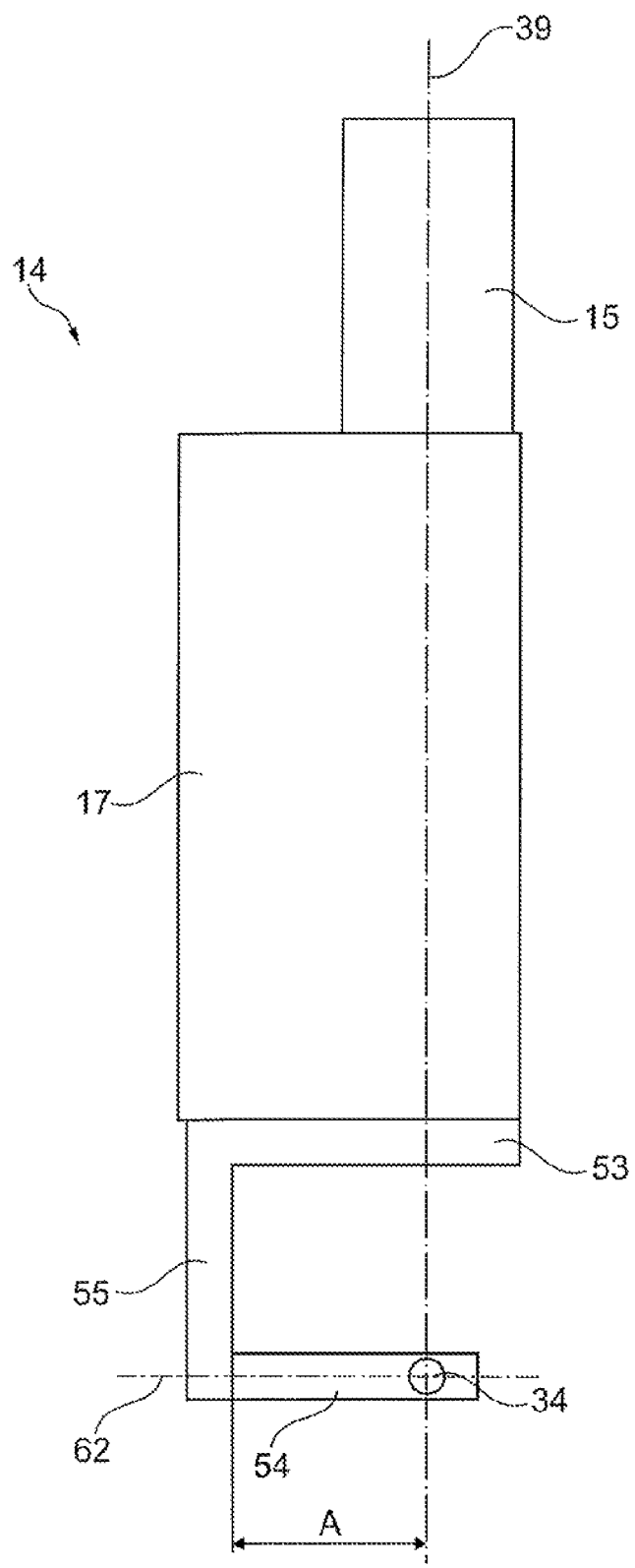

Further advantages and advantageous embodiments of the subject matter of the present invention become apparent from the patent Claims and the exemplary embodiment schematically described in the following with reference to the accompanying drawing. In the drawing, FIG. 1 shows a highly schematized longitudinal sectional view of a jet engine provided with a one-piece rotor area, FIG. 2 shows an enlarged individual representation of a blade element of the one-piece rotor area as per FIG. 1, FIG. 3 shows a side view of a rolling tool device, and FIG. 4 shows the rolling tool device as per FIG. 3 in a view IV represented in more detail in FIG. 3, with the rolling tool device being represented in highly simplified form.

FIG. 1 shows a longitudinal sectional view of a jet engine 1. The jet engine 1 is provided with a bypass duct 2 and an inlet area 3 downstream of which a fan 4 is arranged in manner known per se. Again downstream of the fan 4, the fluid flow in the jet engine 1 divides into a bypass flow and a core flow, with the bypass flow passing through the bypass duct 2 and the core flow into an engine core 5 which, again in a manner known per se, is provided with a compressor arrangement 6, a burner 7 and a turbine arrangement 8.

Figure 2:
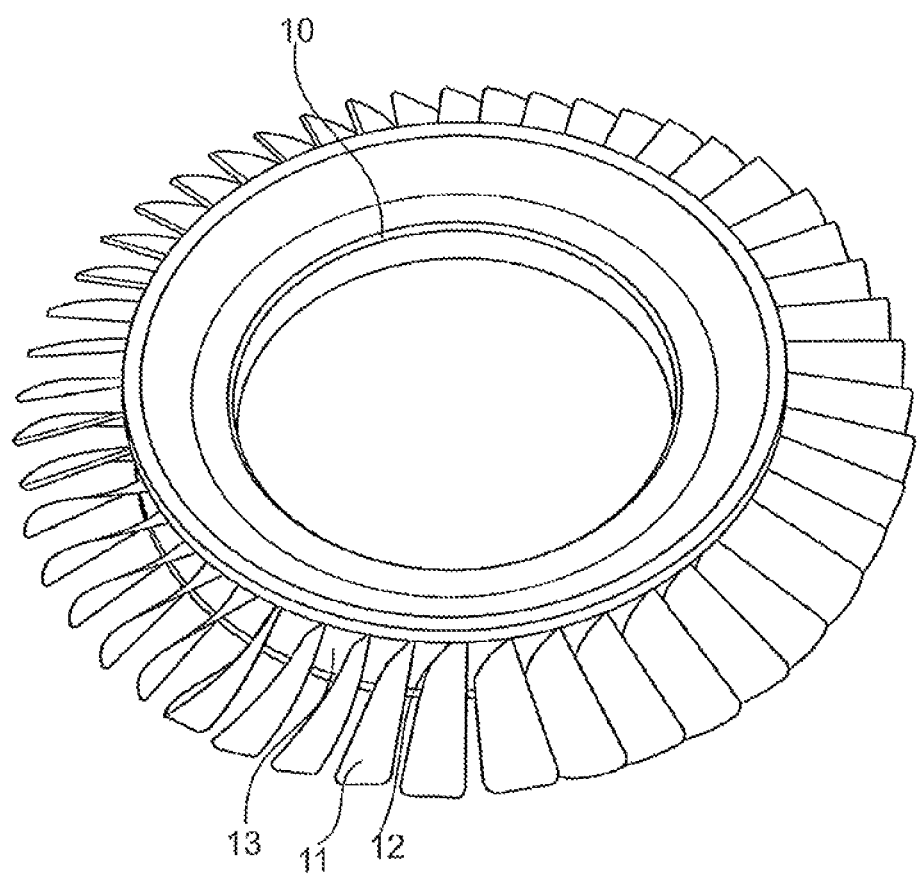

FIG. 2 shows an enlarged individual view of a one-piece rotor area 9 of the compressor arrangement 6. The one-piece rotor area 9 includes an annular base body 10 and several circumferentially distributed blade elements 11 extending essentially radially from the base body 10.

The one-piece rotor area 9 is a so-called blisk, i.e. an integrally bladed rotor design. The term blisk is composed of the words "blade" and "disk". The disk or, respectively, the annular base body 10 and the blade elements 11 are made in one-piece, removing the need for blade roots and disk slots provided on multi-piece rotor areas. The one-piece rotor area 9 is distinct from conventionally bladed compressor rotors by a significant decrease in the number of components and the disk shape of the annular base body 10 is designed for lower rim loads. In combination with the use of lighter materials, this results in a weight saving of the one-piece rotor area 9 of up to 50 percent compared with conventional rotor areas. The amount of weight saving is in each case dependent on the geometry of the compressor arrangement 6.

A compressor arrangement 6 or a respective one-piece rotor area 9 with resistance to foreign object damage and also vibratory loading, while at the same time keeping the weight low, is created, when residual stresses are imparted to the blade elements 11 in surface-near areas by way of compression rolling using a rolling tool device 14 or a rolling tool, respectively, radially engaging in each case between the blade elements 11 and further shown in FIG. 3, with a surface area of each blade element, in particular the entire surface of each blade element 11 being compression rolled in each case. Additionally, the transitional areas 12, or fillets, respectively, between the surfaces of the blade elements 11 and a surface 13 of the base body 10 between the blade elements 11 can also be compression rolled by means of a so-called one-finger rolling tool not further shown in the drawing. Furthermore, the surface 13 or, respectively, the annulus of the base body 10 between the blade elements 11 is preferably also compression rolled by means of a one-finger rolling tool.

Compression rolling of surfaces of the longitudinal sides and the edges of the blade elements 11, the transitional areas 12 and the surface 13 of the base body 10 in each case solidifies surface-near areas of the one-piece rotor area 9 by increasing dislocation density and hardens the surface layer of the rotor area 9. Hardening the surface layer reduces the risk of cracking resulting from foreign object damage and vibratory loading. Moreover, the residual compressive stresses imparted by compression rolling into the material in the zone of the rotor area 9 counteract crack propagation after crack formation, thereby positively influencing fatigue strength and, thus, improving the service life of the jet engine 1.

Compression rolling provides the one-piece rotor area 9 with high surface finish and low surface roughness, thereby positively influencing the aerodynamic quality of the blade elements 11 and of the entire rotor area 9 without the need for a further surface smoothening process to be performed subsequently to the solidification process.

FIG. 3 shows a side view of a rolling tool 14 for compression rolling of the longitudinal sides or, respectively, the entire surface of the blade elements 11 of the rotor area 9. The rolling tool 14 includes a tool carrier 15, which can be connected to a carrier spindle 16 of a machine tool to the extent shown. Two pliers-type bodies 17, 18 of the rolling tool 14 are rotatably connected to the tool carrier 15 in the area of a pivot bearing 19, with the pliers-type bodies 17, 18 being coupled via a driving unit 20 provided here as single-acting piston-cylinder unit and a distance between rolling areas 21, 22 being reduced in dependence of a driving unit-side rotary movement of the pliers-type bodies 17 and 18 about the pivot bearing 19.

For this, the driving unit 20 is subject to hydraulic pressure and a piston element 23, by the hydraulic pressure acting on it, is extended from a cylinder element 24 of the driving unit 20, with a distance between the ends 25 and 26 of the pliers-type bodies 17 and 18 facing away from the rolling areas 21 and 22 being increased during such a change of the operating state of the driving unit 20, while the distance between the rolling areas 21 and 22 is decreased according to the geometric situation in dependence of the rotary movement of the pliers-type bodies 17 and 18 about the pivot bearing 19. The pliers-type bodies 17 and 18 are each rotatably connected to the driving unit 20 in the area of their ends 25 and 26.

Furthermore, the two pliers-type bodies 17 and 18 are additionally rotatably attached to the tool carrier 15 about the pivot bearing 19 around a rotary axis 27 vertically aligned to the drawing plane to enable the pliers-type bodies 17 and 18 to be swivelled upon contact of the rolling areas 21 and 22 with a blade element 11 and avoid distortion of the blade elements 11 resulting from the contact of the rolling areas 21 and 22 with the blade element. During joint rotation of the pliers-type bodies 17 and 18 about the pivot bearing 19 relative to the tool carrier 15, a distance between the rolling areas 21 and 22 remains constant. Joint rotatability of the two pliers-type bodies 17 and 18 about the pivot bearing 19 further ensures that the blade elements 11, each of which being provided with a blade profile, can be compression rolled on their entire surface using the rolling tool 14.

The pliers-type bodies 17 and 18 are operatively connected to the tool carrier 15 via piston elements 28 and 29, with the pliers-type bodies 17 and 18 being reset by the piston elements 28 and 29 relative to the tool carrier 15 about the pivot bearing 19 to a zero position defined relative to the tool carrier 15 and shown in FIG. 3, when a rotating force jointly rotating the pliers-type bodies 17 and 18 about the pivot bearing 19 is essentially zero.

Via a resetting device 32, here including two spring-action devices 30 and 31 and associated to the pliers-type bodies 17 and 18, a distance between the rolling areas 21 and 22 can be changed in the direction of a maximum value by rotating the pliers-type bodies 17 and 18 on the side of the resetting device.

Each of the rolling areas 21 and 22 here includes a ball element 33, 34 detachably retained in holding areas 35, 36, and thus being replaceable, and subjectable to hydraulic pressure in a manner known per se to enable the rolling pressure required in each case to be applied to the blade elements 11 via the ball elements 33 and 34. The holding areas 35 and 36 are here inserted into adapter elements 37 and 38 which are firmly threadedly connected to the pliers-type bodies 17 and 18, and preferably connected to said adapter elements by means of grub screws.

The adapter elements 37 and 38 are each interchangeably connected to the pliers-type bodies 17 and 18, with the rolling tool 14 providing for various engagement depths in the radial and/or the axial direction between the blade elements 11, depending on the shape of the adapter elements 37, 38. Moreover, adapter elements 37 and 38 designed with respect to the transmittable pressure or rolling force, respectively, are connectable to the pliers-type bodies 17 and 18, with thinner adapter elements being insertable into narrower areas between the blade elements 11. Here, lower rolling or pressure forces, respectively, are applied to thinner blade elements 11 with more slender adapter elements 37 and 38, with the adapter elements 37 and 38 then having a certain elasticity and the maximum rolling force being limited by the elasticity of the adapter elements 37 and 38.

The adapter elements 37, 38 have here a U-shaped cross-section, as can be seen in FIG. 4, where the adapter elements 37, 38 are designed in principle with three parts 53, 54, 55.

The first parts 53 of the adapter elements 37, 38 extend substantially in the direction of the rotary axis 27 and are used for arranging the adapter elements 51 and 52 on the pliers-type bodies 17 and 18, shown only in highly simplified form in FIG. 4. The second parts 54 are arranged substantially parallel to the first parts 53, but offset relative to the first parts 53 in a direction facing away from the pliers-type bodies 17 and 18. In the present invention, the parts 54 are designed substantially bar-shaped with a main axis 62 corresponding to a center axis of the parts 54 and extending parallel to the rotary axis 27. The ball elements 33 and 34 are arranged on the second parts 54 of the adapter elements 51 and 52. Both the first parts 53 and the second parts 54 run, in the embodiment shown, substantially in a preferred axial insertion direction of the rolling tool device 14 into the blade elements 11.

The first parts 53 and the second parts 54 of the adapter elements 51 and 52 are connected by the third parts 55, where the latter—in the view according to FIG. 4—run substantially parallel to the axis 39 and are arranged offset thereto and completely outside the axis 39.

The third parts 55 are at a distance relative to axes 58 and 59 passing through a machining point 60 and 61 of the ball elements 56 and 57 respectively and extending parallel to the axis 39.

Various designs of the adapter elements 51 and 52 can be provided, in which an area of the adapter elements 51 and 52 is arranged offset relative to the axis 39. For example, the adapter elements can have an arched or semi-circular area, with the respective shape of the adapter elements 51 and 52 being selected such that an axial engagement in particular in blade elements 11 is possible to the required extent for the machining of blade leading edges and blade trailing edges preferably in multi-stage rotors in blisk design. Engagement into areas of blade elements 11 poorly accessible with conventionally shaped adapter elements is greatly simplified or only made possible by the rolling tool device 14 with the adapter elements 51 and 52, since the arrangement in particular of the third parts 55 of the adapter elements 51 and 52 does not hinder insertion of the rolling tool device 14 in the axial direction of the blade elements 11. The greater a distance A of the third parts 55 of the adapter elements 51 and 52 from the axis 39, the deeper the engagements into the blade elements 11 that can be achieved when the rolling tool device 14 is inserted in the axial direction of the rotor area 9.

Full solidification of the blade elements 11 during compression rolling is avoidable by limiting the maximum rolling force, with excessive pressure loading during compression rolling producing a compressive stress maximum in the center area of the blade elements 11 which promotes crack formation from the inside under vibratory loading. This, however, is undesirable as it affects the service life of the blade elements 11.

The rolling force imparted in each case to the rotor area during compression rolling is variable to the desired extent at each location of a blade element 11 and also in the transitional areas 12 and the remaining surface 13 of the base body 10 by controlling the hydraulic pressure applied to the rolling areas 21, 22 via a pressure control unit not further shown in the drawing, thereby enabling the rotor area 9 to be solidified to the desired extent by producing the optimum residual compressive stresses required at each location of the rotor area 9 and an improvement to be obtained with regard to the durability of the blades.

In order to facilitate, for example, CAD-CAM programming upstream of a compression rolling process using the rolling tool 14 and subsequent implementation of the manufacturing programs on a multi-axes machining center by means of a post processor, an axis 39 of the carrier spindle 16 in the operating state connected to the tool carrier 15 passes between the rolling areas 21 and 22 through a contact point present at a distance between the rolling areas 21 and 22 equal to zero. Thus, the axis or the spindle carrier axis 29, respectively, and an axis through the contact point between the rolling areas 21 and 22 are congruent, thereby substantially facilitating programming of the rolling process.

The rolling tool 14 enables integrally bladed disks and rotors of jet engines to be compression rolled at low cost. The rapid and easy exchange of the adapter elements 37 and 38 qualifies the rolling tool 14 with low setup times for use with rotor areas having different geometry, with different engagement depths between blade elements as well as different processing forces during the rolling process being realizable on differently conceived components with high safety and process capability.

The pliers-type design of the rolling tool 14 enables blade elements or airfoils, respectively, of one-piece rotor areas to be processed from the tip to the fillet, with simultaneous compression rolling of the pressure and suction sides of blade elements being provided to avoid distortion due to the process.

In addition, various individual tools enable the fillets or the transitional areas, respectively, between the surface of the blade elements and the surface of the base body between the blade elements on the suction and pressure side to be processed to the desired extent. Moreover, the surface of the base body between the blade elements or the annulus, respectively, can be compression rolled by means of an individual tool.

Damage of the blade elements 11 to be machined and of the rolling tool 14 proper can be prevented in the embodiment shown by the provision of a spacer device 40, by means of which a minimum distance can be fixed mechanically between the rolling areas 21 and 22.

The spacer device 40 here has two holding elements 41 and 42, of which one holding element 41 is firmly connected to the driving unit 20 in an area of the driving unit 20 facing towards the pliers-type body 17, and one holding element 42 is firmly connected to the driving unit 20 in an area of the driving unit 20 facing towards the pliers-type body 18. Each holding element 41 and 42 has in the present invention a hole through which a rod 43 of the spacer device 40 is passed.

The rod 43 is firmly connected at one end to the holding element 42, i.e. immovable in the axial direction of the rod 43, with the rod 43 for example being screwed into a thread of the holding element 42 and locked using a grub screw 46 in the axial direction of the rod 43. At the other end, the rod 43 is passed through the hole of the holding element 41 which guides the rod 43. On a side of the holding element 41 facing away from the holding element 42, the rod 43 is provided with a thread 44 on which is arranged a setting screw 45 which can be fixed in an exact position, for example by means of lock nut. The setting screw 45 has a larger diameter than the hole in the holding element 41, so that a movement of the pliers-type bodies 17 and 18 above the rotating point 19 in directions opposite to one another is limited when the setting screw 45 comes into contact with the holding element 41 during a movement of the pliers-type bodies 17 and 18 by the driving unit 20. Accordingly, the spacer device 40 determines a minimum distance of the rolling areas 21 and 22 and of the ball elements 33 and 34 respectively from one another. This prevents in a simple manner that the ball elements 33 and 34 come into contact with one another prior to insertion of the rolling tool device 14 into the blade elements 11, or come into contact so hard that they are damaged.

On the other hand, it is possible using the spacer device 40 to prevent, during insertion of the rolling tool device 14 into the blade elements 11 to be machined, a force acting on a blade leading edge from deforming the blade leading edge and from affecting the mechanical properties of this blade leading edge to an undesired extent. The risk of deformation of the blade leading edge is generally speaking relatively high solely for the reasons that it is very thin and can be deformed even by low forces acting on it. By means of the spacer device 40, a minimum distance of the ball elements 33 and 34 is for example selectable such that an area of the blade leading edges of the blade elements 11 remains unmachined during a compression rolling operation.

The setting screw 45 can be fixed in various positions of the thread 44 of the rod 43, so that depending on the blade elements 11 to be machined a minimum distance between the ball elements 33 and 34 can be adapted to the respective application.

The spacer device 40 has here a large distance to the rotating point 19, so that an advantageously precise setting of the minimum distance of the ball elements 33 and 34 can be achieved.

Basically, the rolling tool 14 can be integrated into any known machining center. In contrast to resolidification by shot peening, there is no need to procure expensive facilities. The rolling tool 14 enables resolidification to be performed, for example, in conventional milling centers. The milling centers are equipped with the rolling tool 14 and the surfaces of one-piece rotor areas are processed using the rolling tool 14 in the area of their surfaces analogically to milling.

LIST OF REFERENCE NUMERALS

1 Jet engine
2 Bypass duct
3 Inlet area
4 Fan
5 Engine core
6 Compressor arrangement
7 Burner
8 Turbine arrangement
9 One-piece rotor area
10 Annular base body
11 Blade element
12 Transitional area
13 Surface of the base body
14 Rolling tool
15 Tool carrier
16 Carrier spindle
17, 18 Pliers-type body
19 Pivot bearing
20 Driving unit
21, 22 Rolling area
23 Piston element
24 Cylinder element
25 End of pliers-type body 17
26 End of pliers-type body 18
27 Rotary axis
28, 29 Piston element
30, 31 Spring-action device
32 Resetting device
33, 34 Ball element
35, 36 Holding area
37, 38 Adapter element
39 Axis
40 Spacer device
41, 42 Holding element
43 Rod
44 Thread
45 Setting screw
46 Grub screw
53 Third part of adapter elements
54 First part of adapter elements
55 Second part of adapter elements
58, 59 Axis
60, 61 Machining point
62 Main axis of the first part
A Distance

What is claimed is:

1. A rolling tool device for compression rolling of blade elements of a rotor area of a jet engine, comprising:
a tool carrier which is connectable to a carrier spindle of a machine tool;
a pliers mechanism including two lever arms connected to the tool carrier to be rotatable with respect to each other about a joint pivot bearing;
a rolling area connected to each lever arm, with a distance between the two rolling areas being variable in dependence on rotary movement of the two lever arms;
an adapter element connecting the rolling area to the respective lever arm, the adapter element including, in a zone of the rolling area, a part having a main axis having an extension component in a direction parallel to a rotary axis of the pivot bearing.

2. The rolling tool device in accordance with claim 1, wherein each of the two parts essentially extend in the direction parallel to the rotary axis of the pivot bearing.

3. The rolling tool device in accordance with claim 1, wherein, each adapter element further includes a further part connecting the part to the lever arm, the further part being, in the direction parallel to the rotary axis of the pivot bearing, arranged at a distance to axes passing through a machining point of the rolling areas, the further part also extending in a direction parallel to an axis of the carrier spindle when connected to the tool carrier.

4. The rolling tool device in accordance with claim 3, wherein the further part substantially runs parallel to the axis of the carrier spindle when connected to the tool carrier.

5. The rolling tool device in accordance with claim 1, wherein the adapter elements are interchangeably connected to the lever arms.

6. The rolling tool device in accordance with claim 1, wherein at least one chosen from the part and the further part is an integral part of the adapter element.

7. The rolling tool device in accordance with claim 1, wherein the adapter elements have a substantially U-shaped cross-section.

8. The rolling tool device in accordance with claim 1, wherein, when the tool carrier is connected to the carrier spindle, the axis of the carrier spindle passes between the rolling areas through a contact point present when a distance between the rolling areas is equal to zero.

9. The rolling tool device in accordance with claim 1, wherein, a distance between the rolling areas remains constant during a rotary movement of the lever arms about the joint pivot bearing.

10. The rolling tool device in accordance with claim 9, and further comprising a piston operating between the lever arms for rotating the lever arms relative to the tool carrier about the pivot bearing to a zero position defined relative to the tool carrier.

11. The rolling tool device in accordance with claim 1, and further comprising a driving unit coupled to the pliers mechanism for rotating the lever arms relative to each other to alter a distance between the rolling areas.

12. The rolling tool device in accordance with claim 11, wherein at least one chosen from the driving unit and a piston element of the driving unit is interchangeable with a respective driving unit or piston element to provide a different force for rotating the lever arms.

13. The rolling tool device in accordance with claim 11, where the driving unit is a single-acting piston-cylinder unit.

14. The rolling tool device in accordance with claim 13, wherein the piston-cylinder unit is interchangeable with a piston-cylinder unit of different force.

* * * * *